Figure 1:
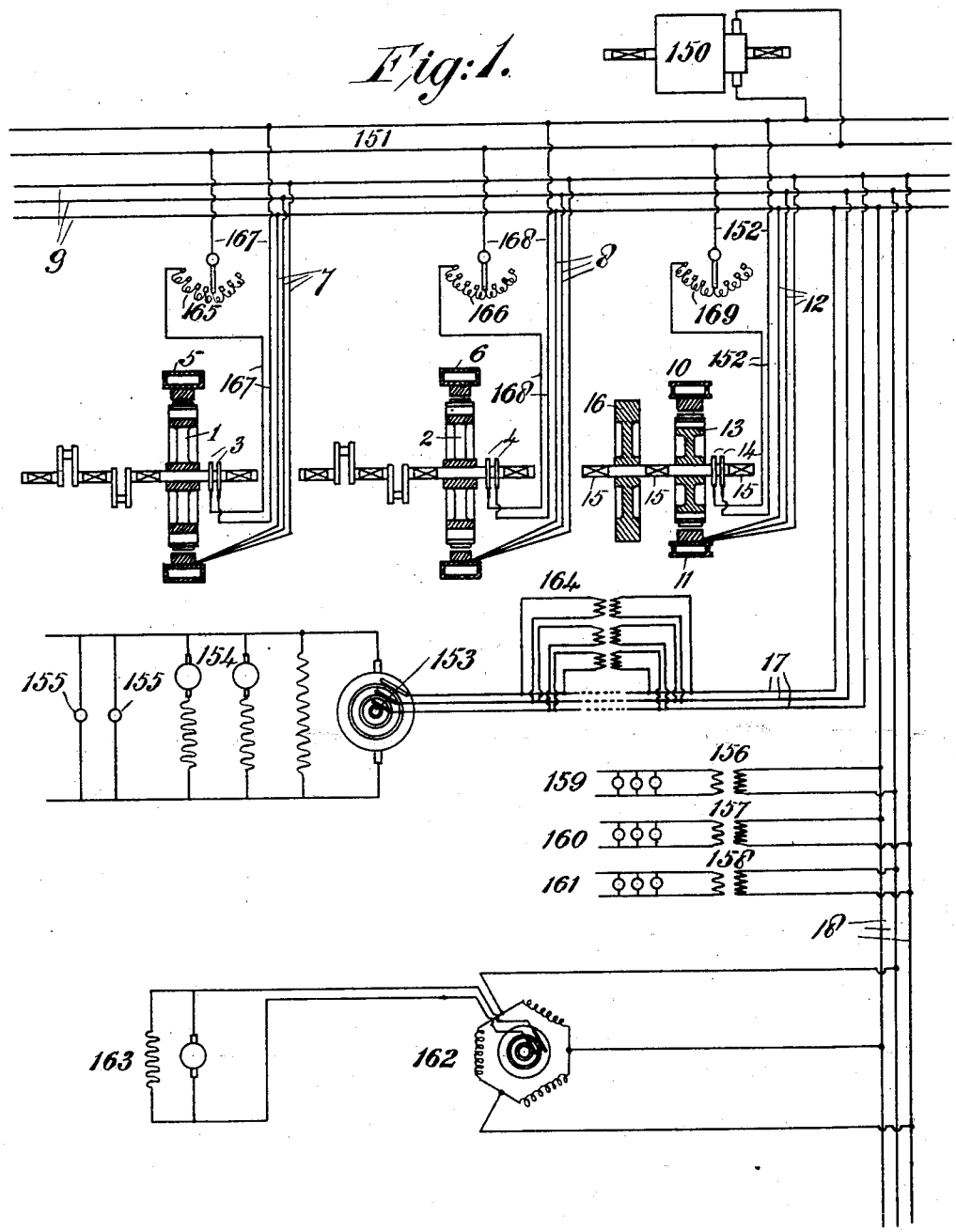

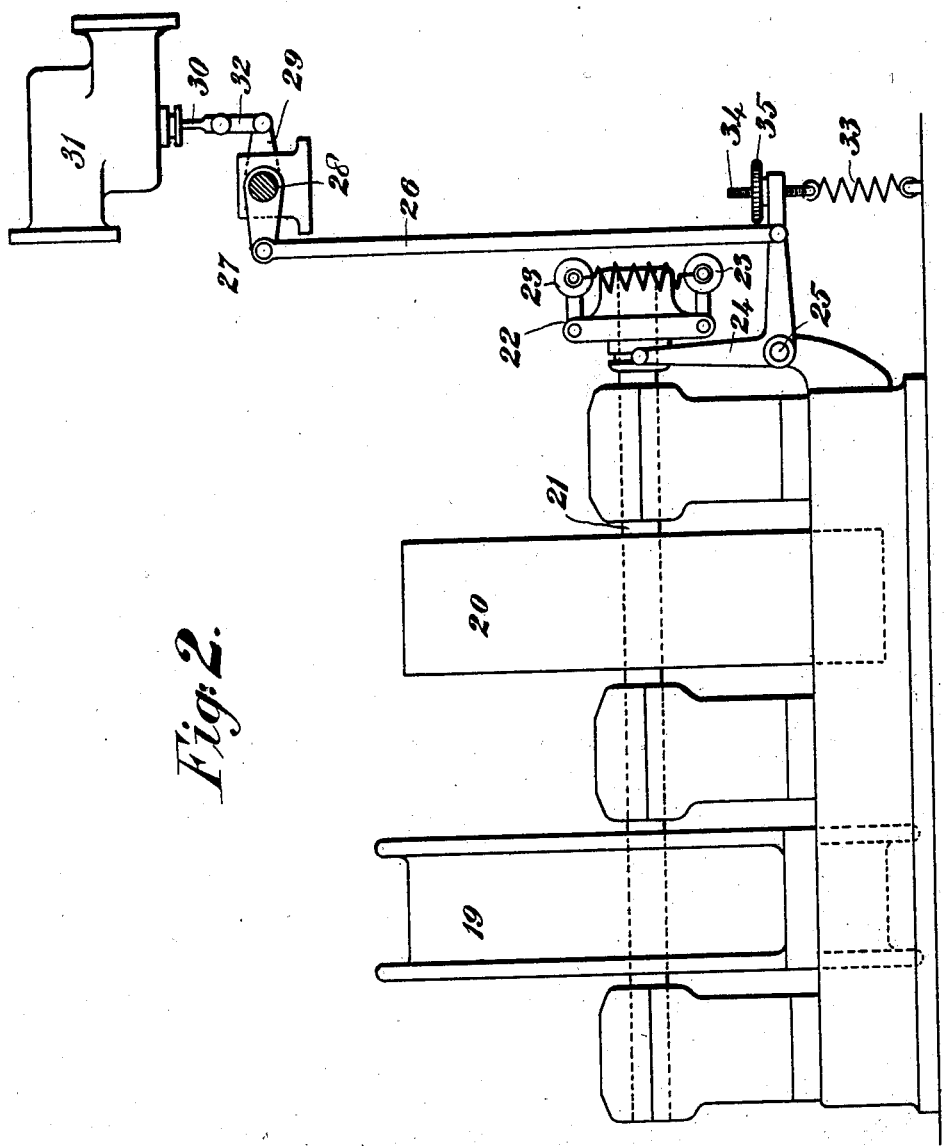

No. 726,952. PATENTED MAY 5, 1903.
H. C. LEAKE.
MEANS FOR AVOIDING HUNTING OF ALTERNATE CURRENT MACHINERY.
APPLICATION FILED APR. 9, 1901.
NO MODEL. 9 SHEETS—SHEET 3.
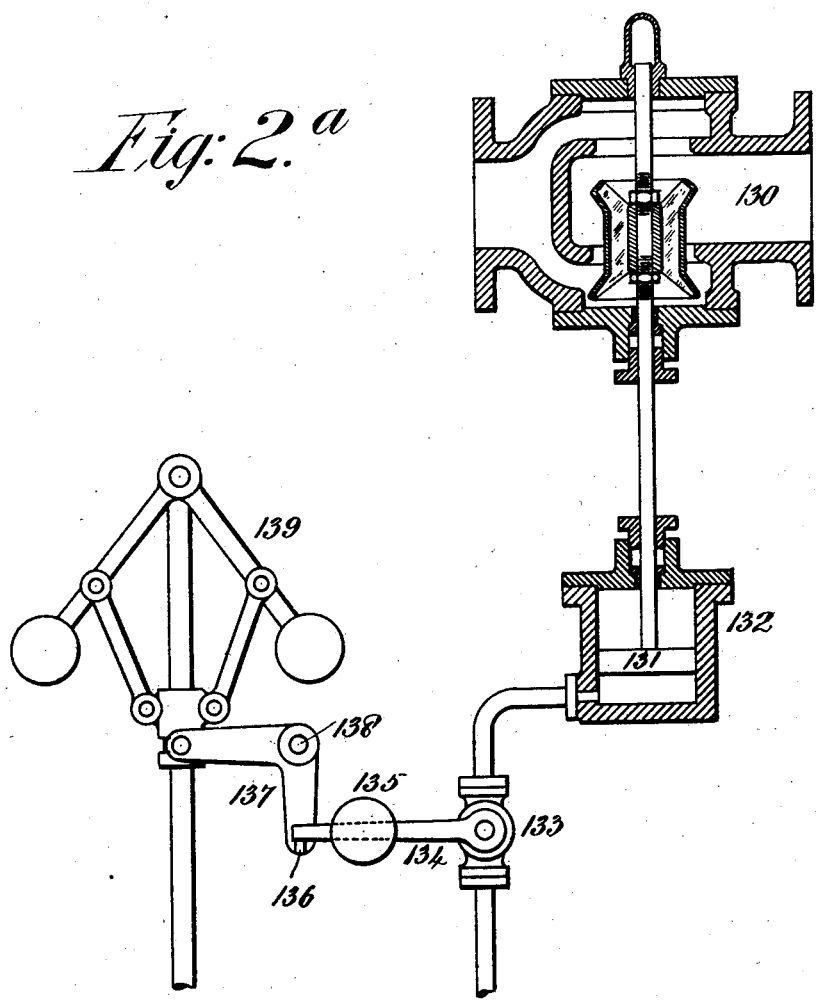
Fig. 2.ᵃ

No. 726,952. PATENTED MAY 5, 1903.
H. C. LEAKE.
MEANS FOR AVOIDING HUNTING OF ALTERNATE CURRENT MACHINERY.
APPLICATION FILED APR. 9, 1901.
NO MODEL. 9 SHEETS—SHEET 4.

No. 726,952. PATENTED MAY 5, 1903.
H. C. LEAKE.
MEANS FOR AVOIDING HUNTING OF ALTERNATE CURRENT MACHINERY.
APPLICATION FILED APR. 9, 1901.
NO MODEL. 9 SHEETS—SHEET 5.

No. 726,952. PATENTED MAY 5, 1903.
H. C. LEAKE.
MEANS FOR AVOIDING HUNTING OF ALTERNATE CURRENT MACHINERY.
APPLICATION FILED APR. 9, 1901.
NO MODEL. 9 SHEETS—SHEET 6.

No. 726,952. PATENTED MAY 5, 1903.
H. C. LEAKE.
MEANS FOR AVOIDING HUNTING OF ALTERNATE CURRENT MACHINERY.
APPLICATION FILED APR. 9, 1901.
NO MODEL. 9 SHEETS—SHEET 7.

Witnesses.
Edwin D. Bartlett
Thomas H. Maassen

Inventor
Henry Cook Leake
per Hubert Lefton Jones
Attorney.

No. 726,952. PATENTED MAY 5, 1903.
H. C. LEAKE.
MEANS FOR AVOIDING HUNTING OF ALTERNATE CURRENT MACHINERY.
APPLICATION FILED APR. 9, 1901.
NO MODEL. 9 SHEETS—SHEET 8.
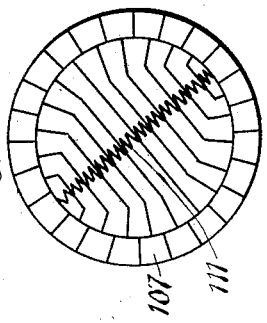
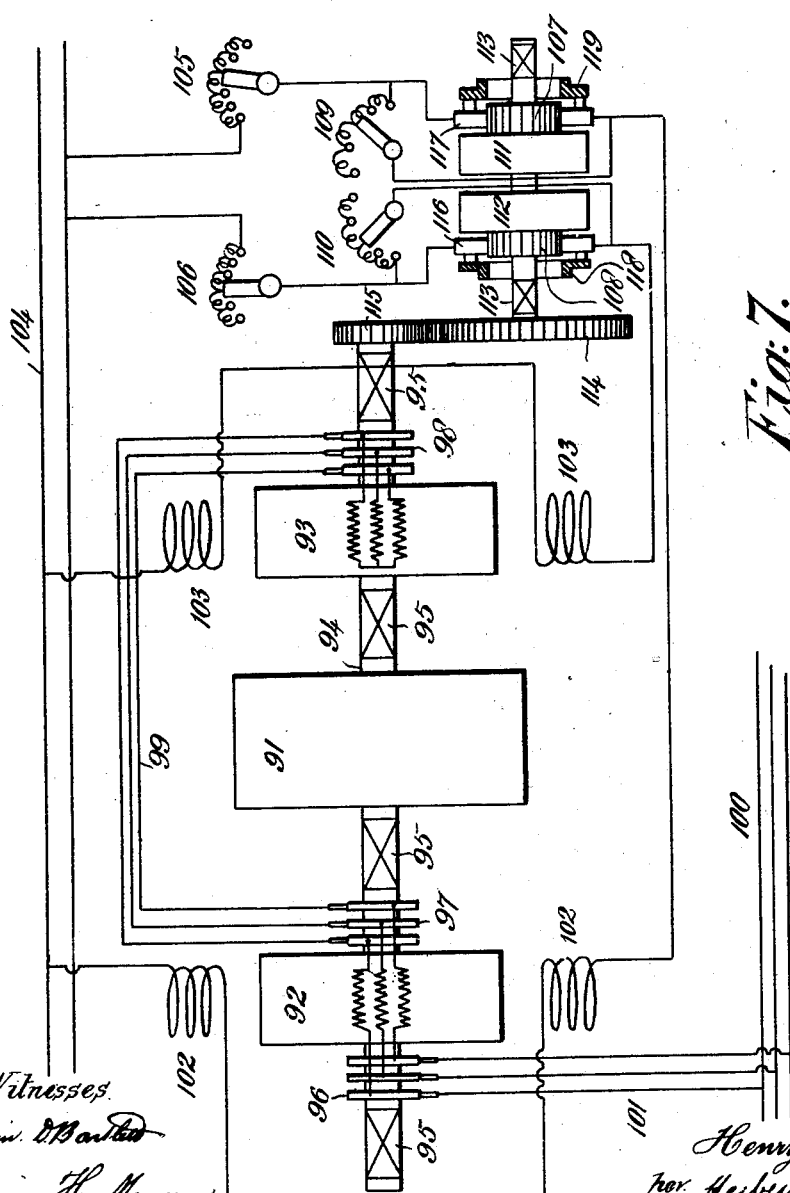
Witnesses
Edwin D. Bartlett
Thomas H. Maasson
Inventor
Henry Cook Leake
per Herbert Lefton Ymes
Attorney No. 726,952.  PATENTED MAY 5, 1903.
H. C. LEAKE.
MEANS FOR AVOIDING HUNTING OF ALTERNATE CURRENT MACHINERY.
APPLICATION FILED APR. 9, 1901.
NO MODEL. 9 SHEETS—SHEET 9.

Witnesses
Edwin D. Bartlett
Thomas H. Maassen

Inventor
Henry Cook Leake
per Herbert Sefton Jones
Attorney

No. 726,952. Patented May 5, 1903.

UNITED STATES PATENT OFFICE.

HENRY COOK LEAKE, OF NEWCASTLE-UPON-TYNE, ENGLAND.

MEANS FOR AVOIDING HUNTING OF ALTERNATE-CURRENT MACHINERY.

SPECIFICATION forming part of Letters Patent No. 726,952, dated May 5, 1903.

Application filed April 9, 1901. Serial No. 55,052. (No model.)

*To all whom it may concern:*

Be it known that I, HENRY COOK LEAKE, a subject of the King of Great Britain, residing at Ormidale, Otterburn Villas, Newcastle-upon-Tyne, in the county of Northumberland, England, have invented a new an useful Improvement in Means for Avoiding Hunting of Alternate-Current Machinery, of which the following is a specification.

This invention relates to parallel systems of electrical distribution in which single phase or multiphase alternate-current machinery—such as alternators, rotary converters, and motors—are so arranged and operated that the potential difference across their terminals is maintained approximately constant in effective value and periodicity. Synchronous apparatus operated on such systems is, as is well known, very liable to give trouble in working, owing to an action known as "hunting," which consists in periodic fluctuation of the angular velocity of the rotating parts of the apparatus, and is often accompanied by excessive periodic interchange of current between the various synchronous apparatus.

This invention has for its object the improved construction of alternating-current machinery and the provision of means whereby this hunting action may be decreased and, in so far as it does occur, caused to be of practical unimportance.

In order that this invention may be the more easily understood, I proceed to explain what appears to me at the present time to be the reason of this hunting.

For purposes of explanation assume that an alternating-current machine of the synchronous type is running on a system of supply the potential difference of which is independently maintained absolutely constant in effective value and periodicity. The potential difference of the system is of course identical with the potential difference at the terminals of the machine, and, as is well known, there is usually a difference between this latter and the electromotive force of the machine. The term "electromotive force of the machine" when used in this description is to be understood to mean that potential difference which would exist between the terminals of the machine if it were working as a generator on open circuit. For a given speed the electromotive force of the machine thus depends only on the exciting-current in the field-winding, and it can of course differ from the potential difference at the terminals of the machine when on load in phase as well as in magnitude. Now if the excitation remains constant the electrical power output or input of the machine at any time depends on the angle-of-phase difference between the electromotive force of the machine and the potential difference of the system. Thus in the case of a generator the more the phase of the electromotive force of the machine is in advance of the phase of the potential difference of the system the greater is its electrical power output up to a certain limit, and in the case of a motor the more the phase of the electromotive force of the machine lags behind the phase of the potential difference of the system the greater is its electrical power input up to a certain limit. Now the ordinary periodic variation of the electromotive force of the machine (corresponding to the periodicity of the system) is, so to say, fixed in relation to the rotating parts of the machine in a way which is unaffected by the load on the machine or whether it is a generator or a motor, by which is meant that whenever the rotating parts of the machine pass through any given position in space the instantaneous value of the electromotive force at that instant has always the same value, depending on the exciting-current and the speed of rotation; but there is no such relation to the rotating parts in the case of the potential difference at the terminals of the machine, and the difference of phase between this and the electromotive force of the machine is variable, depending on the excitation and the load. It therefore follows that if to the synchronous machine is applied a given constant torque (positive if a generator or negative if a motor) there will be a definite and constant angular displacement between a radius fixed in position relative to the moving parts of the machine and a radius which rotates at a constant angular velocity corresponding to the constant periodicity of the supply system and that if for any reason this angular displacement increases or decreases the electrical output or input of the machine alters in such a way as will tend to restore this angular displacement to its original value. Therefore since the rotating parts of the machine (including a separate fly-wheel or anything similar in rigid connection) have a certain moment of inertia they will have a definite natural periodic time of oscillation in position relative to this uniformly-rotating radius, and consequently there will be a natural periodic time of fluctuation of the angular velocity of the rotating parts and of the electrical output or input. The magnitude of this natural periodic time of oscillation increases as the moment of inertia of the rotating parts increases. It is thus evident that there is an inherent liability to oscillation in the motion of the rotating parts of the synchronous machine. Such oscillatory motion will be superposed on the constant rotatory motion corresponding to the periodicity of the system. If these natural oscillations are set up in any way—such as, for instance, by sudden change of load—they will soon die out if left to themselves.

If there is a periodic fluctuation in the mechanical driving torque or in the mechanical resistance to rotation of the moving parts of the machine, such fluctuation will produce oscillatory motion of the rotating parts, and on account of the above-mentioned inherent liability to oscillation the amplitude of this oscillatory motion may under suitable conditions become very large in relation to the initial cause. For instance, when the periodic time of the fluctuation of torque or resistance is constant (as in the case of the ordinary cyclical fluctuation of torque of a reciprocating prime mover) the oscillatory motion produced will be permanent and in accordance with the laws of forced vibration. The periodic time of these oscillations will be the same as the periodic time of the fluctuation of torque or resistance, and the amplitude will depend on the closeness of equality between this periodic time and the natural periodic time of oscillation of the machine in question and will become a maximum, in accordance with the law of resonance, when the periodic times are approximately equal. It is therefore evident that under suitable conditions a small periodic disturbing cause may produce serious hunting, with consequent large periodic fluctuation in the electrical current and power of the machine. The current and the power will not vary proportionally, since as the excitation is constant the power factor of the current will not remain constant during these fluctuations.

In the foregoing explanation of the action of a single machine it has been assumed that the potential difference of the system is maintained absolutely constant in effective value and periodicity by some means independent of the machine under consideration. In actual practice we have two or more synchronous machines connected by conductors having more or less resistance and running in parallel without any means independent of the machines for preserving constancy of the potential difference of the system. The periodic fluctuations in electrical output or input referred to above will therefore to some extent affect the potential difference of the system and prevent it from being perfectly constant in effective value and periodicity unless it were to happen that the above fluctuations of output or input of the various machines exactly balanced one another. The fluctuations in the effective value and periodicity of the potential difference of the system will modify the action of the machines and the magnitude of the fluctuations in their output or input, but the general nature of the phenomena is the same.

In the case of direct-coupled generators the matter is sometimes further complicated by the action of the governors of the prime movers which may respond to the periodic fluctuations of angular velocity, and the effect of their action is often to intensify these fluctuations. As is well known, such action of the governors can usually be reduced by reducing the sensitiveness of the governor in conjunction with the use of a suitable dash-pot. Further, hunting of synchronous machines even when subject to uniform torque—as, for instance, in the case of rotary converters—may be set up by small periodic fluctuations in the periodicity of the system of supply due, for instance, to periodic fluctuation in the angular velocity of the generators, and the action in this case may be explained in a similar manner.

When electrical power output or input is referred to in the foregoing explanation, the mean value during a semiperiod of alternation of electromotive force should be understood thereby and not necessarily the instantaneous value, since this, as is well known, sometimes passes through two complete periods of fluctuation in the time of one complete alternation of electromotive force.

As is well known, stationary transformers are often inserted between synchronous machinery and the system of supply in order to effect a change in the voltage; but these do not materially affect the phenomena as they transmit the fluctuations of current, voltage, and periodicity.

It is well known that fluctuations in the torque of actual prime movers, howsoever caused, are made up of components of several different periodic times, and therefore the term "periodic time of fluctuation of the torque of the prime mover" is in this specification to be understood to refer to that component which is of greatest importance in each particular instance, having regard to all the circumstances of the case.

When alternators direct coupled to prime movers with fluctuating driving torques are required to run in parallel, it is customary at the present time to make the moment of inertia of each alternator or of its separate fly-wheel so large that the variation of angular velocity during any revolution on a load offering a constant torque is reduced to a very small amount. The effect of this large moment of inertia is that the natural periodic time of each generator is relatively large.

In all synchronous machinery as actually constructed a certain damping effect is exerted by means of a portion of the losses of energy which take place therein, and this damping effect tends to prevent the hunting becoming excessive. This damping effect is frequently increased by special design of the apparatus; but such methods of restraining serious hunting have the objection that they involve loss of energy.

In order to avoid some of the difficulties of parallel running, I propose whenever possible to reduce the natural periodic times of the various synchronous apparatus by reducing the moment of inertia of their rotating parts until the various natural periodic times are considerably smaller than the periodic time of any important periodic disturbing influence, as under these conditions the liability to resonance effects will be small. Irrespective of resonance effects it is also an advantage to reduce the natural periodic times on account of the irregular non-periodic changes of load to which almost every machine and system are subject. This method of reducing the natural periodic time by reducing the moment of inertia will be most applicable in the case of alternate-current generators direct driven by steam-engines or other prime movers, as these sets are commonly fitted with large separate fly-wheels or the alternator itself is specially designed to have large moment of inertia. In some cases I should propose to reduce the moment of inertia of the rotating parts to the minimum necessary for constructive reasons.

My invention in its application to direct-driven generators consists, essentially, in the provision of means for preventing undue fluctuation in the potential difference and periodicity of a system of supply when the moment of inertia of the rotating parts of the several prime movers and direct-driven generators feeding it, being proportioned as described above in order that the natural periodic times shall be small, are not in themselves large enough to maintain sufficient steadiness in the potential difference and periodicity, whether the fluctuation in potential difference and periodicity be periodic, as when due to periodic fluctuation in the driving torques of the prime movers, or non-periodic. One method which I employ to effect this consists in the use of a specially-arranged compensating synchronous motor, which I herein term for convenience of description a "kinetic compensator." A kinetic compensator would consist of a suitable synchronous motor the rotating parts of which have a moment of inertia such that at its normal speed the stored energy is very large, or, alternatively, the required moment of inertia may be provided in a separate fly-wheel mounted on the same shaft. This motor would be designed for the same periodicity of alternation of current as the system of supply and would be run in parallel with the system. This motor might be designed to run at any suitable speed; but this would usually be fixed somewhat high in order to reduce weight and cost.

A kinetic compensator, as described above, maintains the potential difference and periodicity of the system sufficiently steady by absorbing and giving out electrical energy automatically at the required times, whether periodically or at non-periodic times, any absorption or restoration of energy being accompanied by corresponding changes in its speed, which may be made practically unimportant by constructing the kinetic compensator with sufficient moment of inertia in its rotating parts.

Instead of employing a separate governor on each prime mover I may in some cases connect a centrifugal governor to the kinetic compensator and arrange it to control the power developed by all the prime movers driving the generators. In this case I prefer to provide the individual prime movers with "runaway-governors" adjusted to come into action only in case of emergency.

It is theoretically possible in the ideal case to design the kinetic compensator so that the necessary periodic fluctuation in its speed is not accompanied by periodic fluctuation in the periodicity of the potential difference of the system; but I anticipate that under the conditions of actual practice there will be a small periodic fluctuation in the periodicity of the potential difference of the system, which will usually be unimportant; but in some cases I may further reduce this periodic fluctuation by arranging the kinetic compensator in a special way, the object being so to construct it that it would automatically periodically absorb and restore energy from and to the system, even when connected to a system the potential difference of which is independently maintained absolutely constant in effective value and periodicity. Provided that the periodic time of fluctuation of the driving torque is definitely related to the periodic time of revolution of the prime movers I may, in order to accomplish this, so arrange the kinetic compensator that periodic excess of energy absorbed by the compensator is partly stored elsewhere than in the rotating parts, or the compensator may in such cases be so arranged that the angular velocity of its rotating part of large moment of inertia is caused to vary periodically by automatically-actuated means of a mechanical or electrical nature even when it is running on a system of supply the potential difference of which is independently maintained absolutely constant in effective value and periodicity. A kinetic compensator arranged in any of these ways periodically absorbs and restores electrical energy even though the effective value and periodicity of the potential difference at its terminals is independently maintained perfectly constant. It should be understood that in every case the moments of inertia of the rotating parts of the various synchronous machines of the system are to be kept small, as previously explained.

The electrical apparatus and systems illustrated in the accompanying drawings show embodiments of my invention; but I desire it to be understood that my invention is not confined to these particular embodiments.

Figure 3:
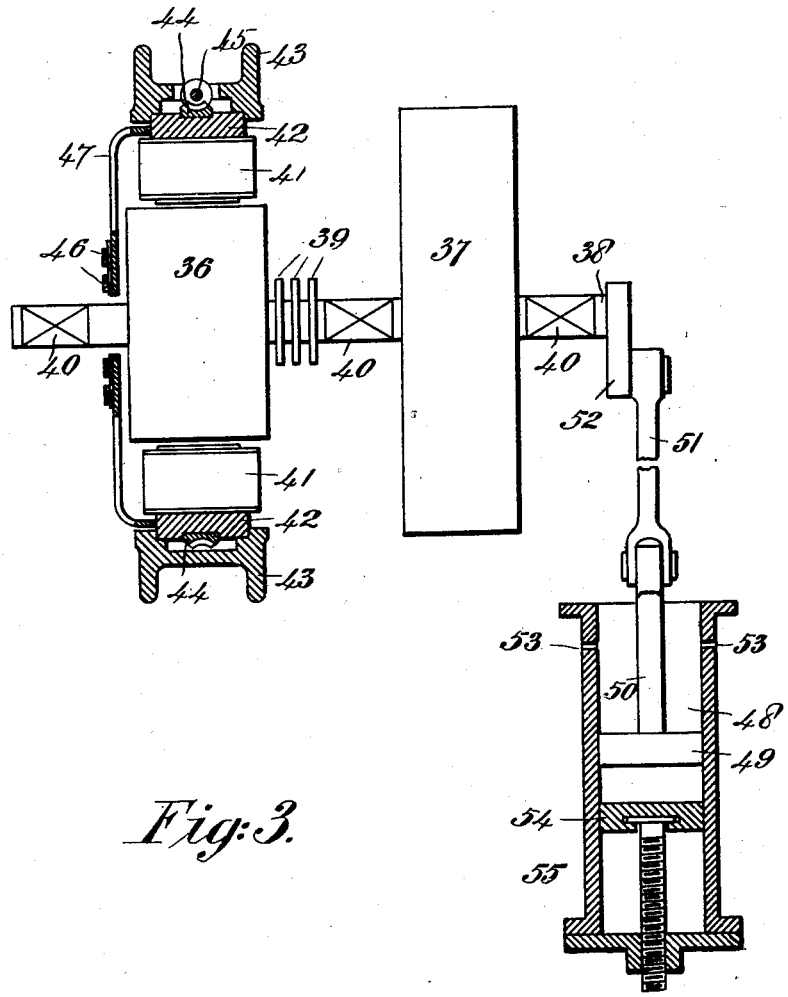
Figure 4:
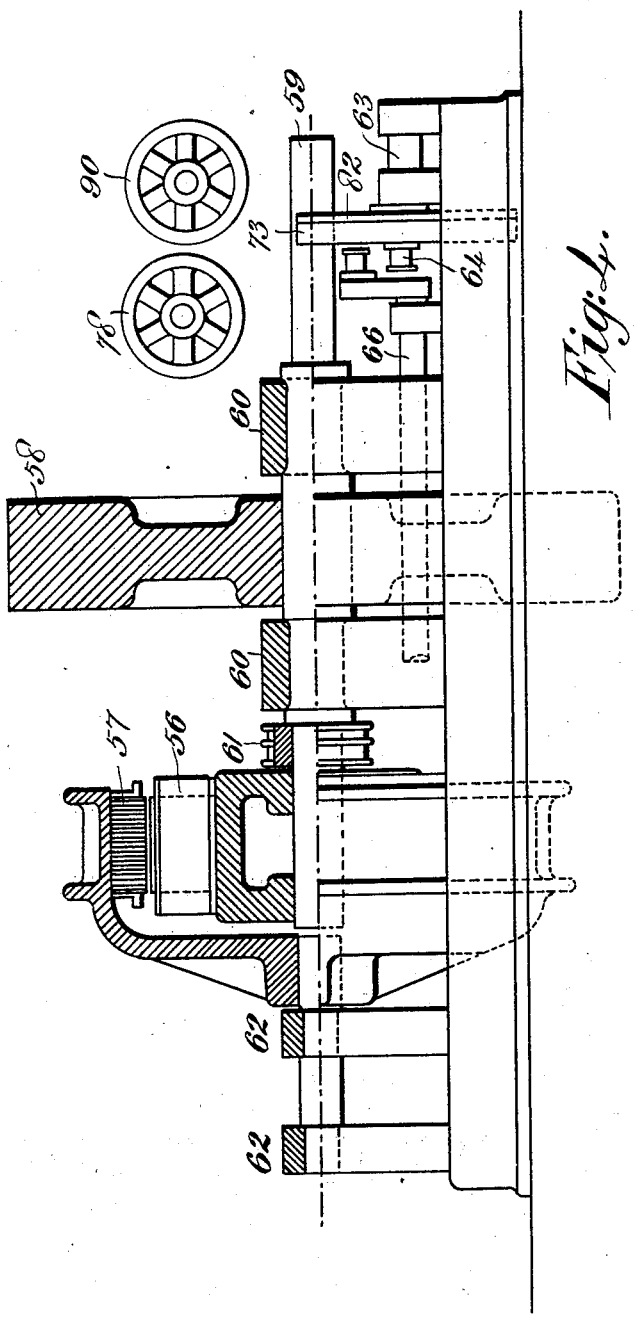
Figure 5:
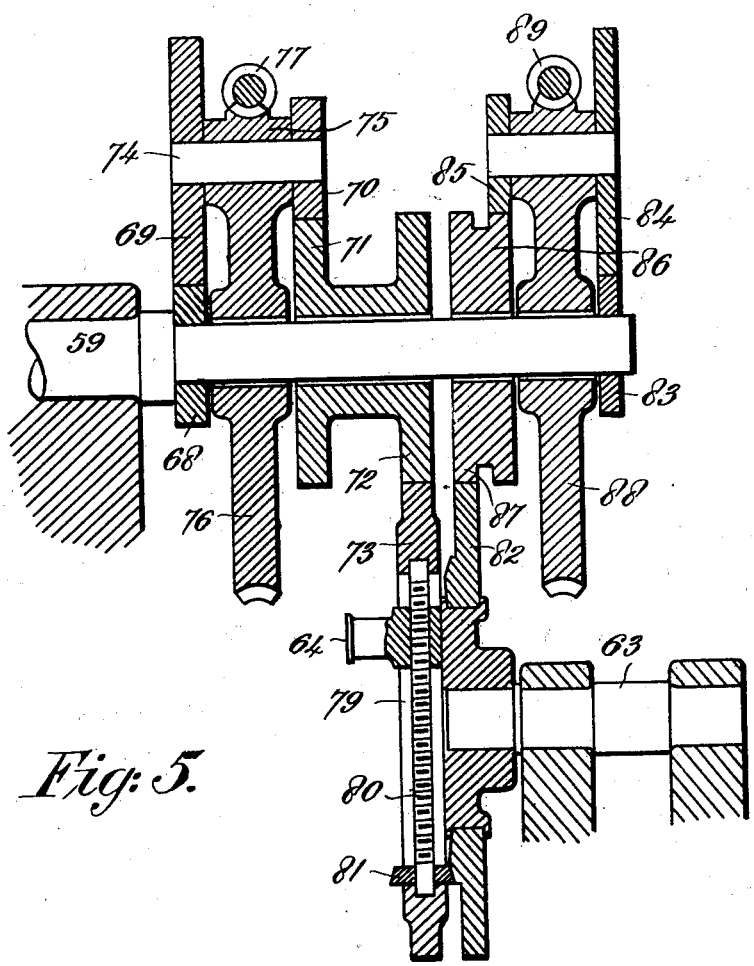
Figure 6:
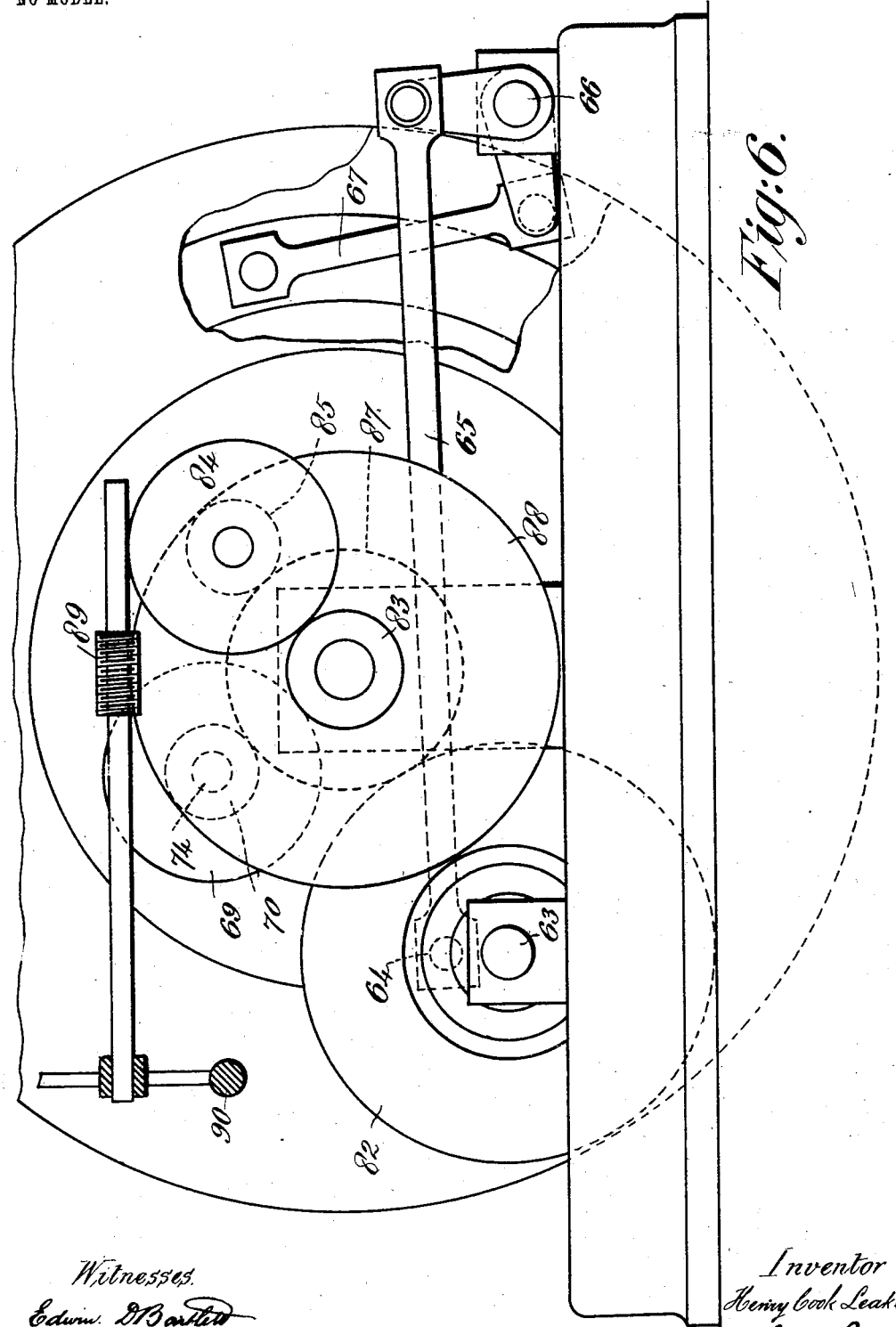
Figure 10:
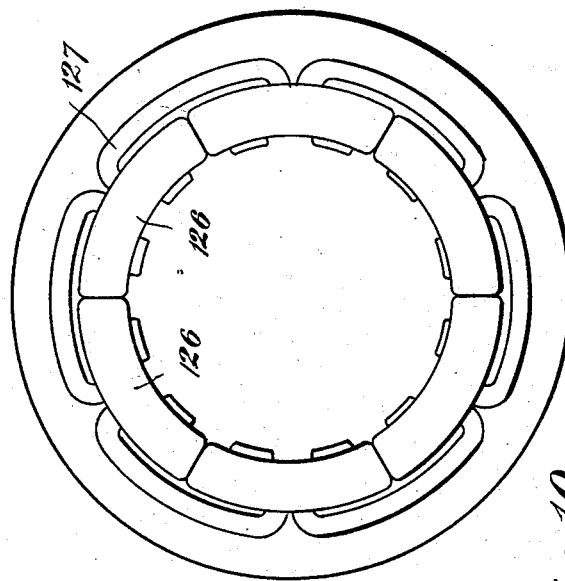
Figure 9:
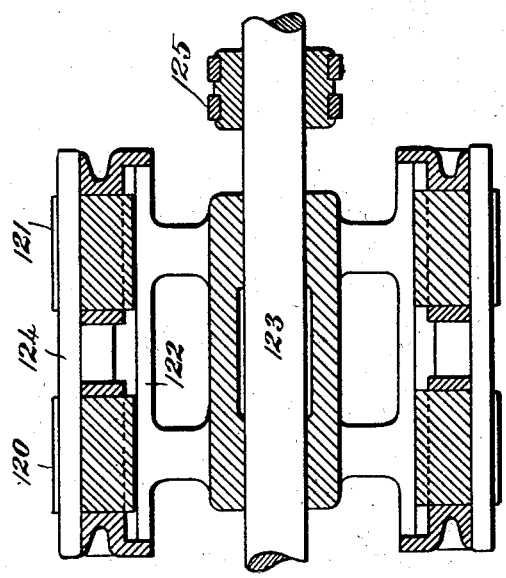

In the accompanying drawings, Figure 1 shows diagrammatically the connections of a system employing a kinetic compensator of the synchronous type, two alternators being shown, each of which is shown as directly coupled to the crank-shaft of a two-crank engine; also a rotary converter, transformers, a synchronous motor, and consuming apparatus. Fig. 2 shows the kinetic compensator provided with a governor which controls the power developed by all the engines. Fig. 2$^a$ shows a suitable arrangement of a runaway-governor to be applied to steam-engines controlled by a governor in the manner shown in Fig. 2. Fig. 3 represents a kinetic compensator geared to a piston working in a cylinder in order to reduce periodic fluctuations of the frequency of the potential difference between the bus-bars of alternators running in parallel. Fig. 4 shows mechanical means for periodically varying the angular velocity of the rotating part of the kinetic compensator having large moment of inertia even when it is running on a system of supply the potential difference of which is independently maintained absolutely constant in effective value and periodicity. Fig. 5 shows details of the gearing shown in Fig. 4 in part sectional elevation. Fig. 6 is a side elevation of the gearing shown in Fig. 5, parts being broken away. Fig. 7 shows diagrammatically electrical means for automatically varying the angular velocity of the rotating part of the kinetic compensator. Fig. 8 is a diagrammatic view of one of the resistances forming part of the means illustrated in Fig. 7, and shows diagrammatically the method of connecting said resistance with the segments of the corresponding commutator shown in Fig. 7. Fig. 9 shows a construction of armature for a kinetic compensator, in which the armature-coils extend over two armature-cores. Fig. 10 shows diagrammatically the field-magnets of a kinetic compensator, which being provided with said field-magnets and one armature is adapted to be operated to cause the angular velocity of the rotating part of the kinetic compensator to fluctuate periodically.

Referring now to Fig. 1, 1 2 are the rotating fields of two three-phase alternators designed so as to have small moments of inertia, the exciting-currents generated by the exciting-machine 150 being conducted to the fields by the leads 151, 167, and 168, the regulating-rheostats 165 166, and the collector-rings 3 4. The stationary armatures 5 6 of the two alternators are connected by the two sets 7 8 of three conductors with the bus-bars 9. The kinetic compensator or compensating-motor 10 is run in parallel from the bus-bars 9, its stationary armature 11, which has a suitable three-phase winding, being connected with said bars through the three conductors 12. The rotating field 13 of the kinetic compensator is excited by means of the exciting-machine 150, the leads 152 connecting the collector-rings 14 with exciting-leads 151 through the regulating-rheostat 169. The rings 14 are mounted on the shaft of the compensator, which can rotate in the bearings at 15 15 15. Said shaft also carries the fly-wheel 16. 17 represents a group of three conductors leading to the rotary converter 153 either through the transformers 164, as shown in full lines, or direct, as shown in dotted lines. The three-phase currents are converted by the converter into a continuous current suitable for the continuous-current motors 154 and the lamps 155. 18 represents three conductors leading to the transformers 156 157 158, feeding the lamps 159 160 161. The three conductors 18 are also shown connected with the loaded synchronous motor 162, which is shown excited by the separate exciting-machine 163. It is to be understood that the fly-wheel may be integral with the rotating part of the motor of the kinetic compensator and that the general arrangement may be applied to systems employing any number of phases. When periodic fluctuation of the driving torque of the prime movers is consequent on reciprocating action or is in any other way directly related to the periodic time of revolution of the prime movers, I may arrange that the generators are switched into circuit in such a way that the relative positions of their respective rotating parts are such that the periodic fluctuations in their respective driving torques as far as possible cancel one another. The object of this is to reduce the work to be done by the kinetic compensator.

Reference being made to Fig. 2, which shows the kinetic compensator provided with a governor adapted to control the power developed by all the prime movers driving alternators in parallel with which the compensator is connected, 19 is the motor, and 20 the fly-wheel, of the kinetic compensator, at the end of the shaft 21 of which is placed a centrifugal governor 22 of any suitable type. The motion of the balls 23 23 is communicated by any convenient means to the bell-crank lever 24, pivoted at 25, and thence through the rod 26 and arm 27 to the shaft 28, carried in suitable bearings. This shaft is carried past the several prime movers to be controlled, which in this case are assumed to be steam-engines, and the movements of the shaft are communicated by means of an arm 29 to the spindle 30 of a throttle-valve 31 through the link 32.

The throttle-valve 31 (shown in the drawings) is only one of several such valves which are operated similarly from the shaft 28. A spring 33, screwed spindle 34, and hand-wheel 35 are arranged to act on a prolongation of the bell-crank lever 24, so as to provide means for adjusting the speed in the usual way. When employing a centrifugal governor to control the power developed by all the prime movers driving the generators, I prefer to provide the individual prime movers with runaway-governors adjusted to come into action only in case of emergency. A runaway-governor which may be employed in this manner is shown in Fig. 2ª, where 130 is a valve inserted in the main steam-pipe of the engine under control. The spindle of this valve is a continuation of the piston-rod attached to the piston 131, which works in the small cylinder 132, steam being admitted when necessary to the cylinder 132 below the piston by means of a cock 133, provided with a lever 134, carrying a weight 135. When this lever is in a horizontal position, the cock 133 is closed. The lever is normally kept in this horizontal position by the support of its end on the pin 136, fixed at the end of one arm of the bell-crank lever 137. This bell-crank lever is pivoted at 138, and its horizontal arm engages with the sliding sleeve of a centrifugal governor 139, which may be of any suitable type and which is driven by the engine under control. This runaway-governor operates in the following manner: When the speed increases above a predetermined amount, the sleeve of the governor rises to such an extent that the pin 136 is withdrawn from the lever 134, which thereupon drops under the influence of the weight 135, and consequently causes steam to be admitted through the cock 133 to the lower end space of the cylinder 132, so that the piston 131 and with it the valve 130 are driven upward, whereby the steam-pipe is completely closed and all further steam shut off from the engine.

I desire it to be understood that the centrifugal governor connected to the kinetic compensator may act on expansion-gear provided on the engines instead of on throttle-valves. Moreover, the governor may act on the engines through a relay instead of through mechanical connections. Thus the governor may control means adapted to be operated either by electricity or steam to actuate the throttle-valve or expansion-gear of the engine. Further, I may run all the prime movers but one uncontrolled except by the runaway-governors and let the governor on the kinetic compensator control the other prime mover only.

Fig. 3 illustrates means whereby the periodic excess of energy absorbed and restored by the compensator is partly stored and given out by other means than by rotating parts, so that the periodic fluctuation of the periodicity of the system may be further reduced. In the case illustrated it is assumed that the relative number of poles of the generators and kinetic compensator are such that the periodic time of revolution of the kinetic compensator is equal to the periodic time of fluctuation of the torque of the prime movers. The piston, which is seen in Fig. 3, is therefore shown connected by a connecting-rod with a crank on the shaft of the kinetic compensator; but in general the piston must be driven from a crank on a counter-shaft, which is geared to the kinetic compensator, so as to rotate at the correct speed. In the kinetic compensator shown in Fig. 3 the armature 36 is mounted, together with the fly-wheel 37, on the shaft 38, carrying the collector-rings 39, said shaft being mounted in suitable bearings 40. The field-magnets 41 are mounted on a yoke-ring 42, which can rotate in a stationary outer frame 43. The worm-wheel 44, fixed to the outside of the ring 42, and a worm and spindle 45, carried by the outer frame 43, provide convenient means for rotating the ring 42 and locking it in any position. The exciting-current is led to the field-magnets through the contact-rings 46, carried on, but insulated from, the spider 47, which is fixed to the ring 42. 48 is a cylinder which contains air and in which the piston 49 is adapted to operate, the piston-rod 50 of said piston being driven through the connecting-rod 51 from the crank 52. Small holes 53 in the sides of the cylinder insure the air-pressure in the cylinder being equal to that of the atmosphere at the commencement of the in-stroke. A fixed piston 54, adjusted in position by means of a screwed spindle 55, enables the maximum air-pressure in the cylinder to be adjusted. Since the kinetic compensator rotates synchronously with the generators, the phase of the torque produced by the compression and expansion of the air can be adjusted relatively to the phase of the torque of the prime movers by rotating the ring 42 and the field-magnets 41 by means of the worm 45. The magnitude of the torque can be adjusted by adjusting the position of the piston 54. I do not limit myself to the particular arrangement shown, as many obvious alterations may be made to obtain the object desired.

Mechanical means for periodically varying the angular velocity of the rotating part of the kinetic compensator, even when it is running on a system of supply the potential difference of which is independently maintained absolutely constant in effective value and periodicity in order that the periodic fluctuation of the periodicity of the system may be further reduced, are shown in Figs. 4, 5, and 6. By these means the angular velocity of the rotating part of the kinetic compensator having large moment of inertia is varied by impressing a periodic motion upon the other part of the kinetic compensator. In Fig. 4 the armature 57 and field-magnets 56 are both capable of rotation concentrically, and means are provided to enable adjustments to be made in the magnitude of the periodic absorption and restoration of energy and also in its phase relative to the fluctuation of torque of the prime movers, which may consist of means for varying the magnitude and phase of the fluctuating velocity ratio of the two parts of the motor. The fly-wheel 58 is mounted on the shaft 59, rotating in the bearings 60. At one end of the shaft 59 are mounted the field-magnets 56 and collector-rings 61 of the synchronous motor, the armature 57 of which is supported by the bearings 62, so that it can rotate. An oscillatory motion is imparted to this armature from the rotating shaft 63, Figs. 5 and 6, through the crank-pin 64 and the connecting-rod 65, the shaft 66, and the connecting-rod 67. The auxiliary shaft 63 is driven from the main shaft 59 through the train of spur-wheels 68 69 70 71 72 73 at such a rate that its period of revolution is equal to the period of fluctuation of the torque of the prime mover. The wheel 68 is fixed on the shaft 59; but the wheels 71 and 72 are loose thereon. The spindle 74, on which the wheels 69 and 70 are fixed, rotates in a bearing 75, carried by a worm-wheel 76, loose on the shaft 59, and said worm-wheel 76 may be rotated by means of the worm 77 and hand-wheel 78, Fig. 4. The crank-pin 64 slides in a slot 79 in the wheel 73, and its position in this slot can be altered through the screw 80 and bevel-pinion 81 by rotating the annular wheel 82 relatively to the wheel 73, said wheel 82 being mounted on the boss of the wheel 73. This annular wheel 82 is driven at the same rate as the wheel 73 by means of a train of spur-gearing similar to that driving the wheel 73 and indicated in the drawings by the reference-numerals 83 84 85 86 87. The worm-wheel 88 can be rotated by means of the worm 89 and the hand-wheel 90, Fig. 4. It will thus be seen that by rotating the hand-wheel 90 alone the magnitude only of the oscillatory motion of the armature can be varied, while by rotating the hand-wheels 78 and 90 simultaneously the phase only of this motion can be varied.

I do not limit myself to the particular means shown in Figs. 4, 5, and 6; but the scope of what I claim is given in the claims accompanying this specification. I may, however, employ purely electrical means in place of the mechanical means described above to cause the angular velocity of the rotating part of large moment of inertia to fluctuate periodically. Figs. 7 and 8 illustrate such means, the diagrams showing an arrangement suitable for a three-phase system. 91 is the fly-wheel, and 92 93 are two rotating armatures mounted on a shaft 94, carried in bearings 95. Collector-rings 96 97 98 enable the windings of the two armatures to be connected in series through the conductors 99 and to the alternating-current bus-bars 100 through the conductors 101. The method of connecting the armature-windings with the collector-rings is shown diagrammatically. 102 103 are the two field-magnets, excited from the exciting bus-bars 104 through the rheostats 105 106, the commutators 107 108, shunted by the rheostats 109 110, and the various conductors shown. The permanent angular displacement between the coils of the two armatures and between the two fields is such as to give a suitable difference of phase between corresponding electromotive forces generated in the two armatures. Each commutator is permanently connected with a resistance 111 112 in the manner shown in Fig. 8, and the commutators and resistances are mounted on a shaft which can rotate in bearings 113, said shaft being geared, through toothed wheels 114 115, with the shaft of the kinetic compensator, so as to make half one revolution in the periodic time of the fluctuation of torque of the prime movers. Two pairs of brushes 116 117, mounted on rockers 118 119, each pair bearing on its commutator at opposite ends of a diameter, are provided for the conduction of the exciting-currents to and from these rotating resistances. In this manner each exciting-current is caused to fluctuate periodically, and if these fluctuations are suitably timed relative to one another they tend to cause the angular velocity of the rotating parts to fluctuate periodically. Since the kinetic compensator rotates synchronously with the generators, the phase of the fluctuations in the two exciting-currents relatively to the phase of the fluctuations of torque of the prime movers may be adjusted by rotating the rockers 118 119. The magnitudes of the fluctuations may be adjusted by means of the rheostats 109 110. It is obvious that the rotating resistances need not necessarily be driven from the kinetic compensator, but may alternately be driven from any shaft running synchronously with the generators. Various other means may be employed for impressing a periodic fluctuation on the exciting-current of the kinetic compensator, and I do not limit myself to any particular means.

In some cases the two armatures 92 93 (represented in Fig. 7) may be so constructed that the same armature-coils extend across both armature-cores. Fig. 9 illustrates such a construction suitable for a single-phase armature of the rotating type. 120 121 are the two armature-cores carried on a spider 122, mounted on the shaft 123. The slots in the two armature-cores are in line, 124 representing a coil of ordinary design and construction which lies in corresponding slots on both armature-cores. This winding is connected to collector-rings 125 in the usual way.

The angular velocity of the rotating part of the kinetic compensator may be caused to fluctuate periodically by providing the kinetic compensator with one armature and with field-magnets of the construction diagrammatically represented in Fig. 10. The armature for a kinetic compensator provided with such field-magnets is of any suitable ordinary type and construction and is adapted to rotate. The field-magnets consist of a structure composed of iron laminations and are somewhat similar to the stator of an induction-motor having a number of longitudinal slots suitably placed around the inner circumference. In Fig. 10 the field-magnet is shown as arranged to give a six-pole field. The six coils 126 are located in some of the slots in such a way as to give a six-pole field, the second set of six coils 127 being located in other slots in such a way as to give a six-pole field slightly displaced in angular position from the former field. In Fig. 10 the two sets of coils are symmetrically placed, the displacement being half the pitch of one coil. These coils carry exciting-currents, which may be caused to fluctuate by any suitable means, such as those previously described with reference to Fig. 7, and the consequent oscillation in the angular position of the resultant field will cause fluctuation in the angular velocity of the rotating part. It is of course understood that the field-magnets may be arranged to rotate, the armature being stationary.

In describing these various methods of minimizing periodic fluctuation in the periodicity of the system it has been assumed, for simplicity of explanation, that the periodic time of the fluctuation of torque is the same for all the prime movers.

Under some conditions I may couple a suitable prime mover to the kinetic compensator in order that the same may give out electrical power while acting as a kinetic compensator, or I may obtain a certain amount of mechanical power from the machine while it is acting as a compensator. Further, instead of employing one kinetic compensator connected to the system I may employ two or more, which may be entirely independent or may have their rotating parts rigidly connected together in suitable angular relation by some form of clutch.

In electric generating-stations where it is desirable or usual to run alternators in parallel one alternator is often sufficient to do the whole work at light load. I therefore desire it to be understood that my invention includes in its scope the running of a single alternator in conjunction with a kinetic compensator on a load consisting of one or more synchronous motors or rotary converters with or without a non-synchronous load, such as lamps fed directly through transformers.

I desire to point out that the most advantageous conditions for the employment of a kinetic compensator are when the moments of inertia of the rotating parts of the various synchronous machines are such that the various natural periodic times are comparatively small, and therefore, generally speaking, no material advantage is to be anticipated from the addition of a kinetic compensator to a system of which the prime movers and generators being direct coupled have rotating parts having combined moments of inertia proportioned as is usual on such machinery at the present time.

It is generally recognized at the present time that it is advantageous to keep the moments of inertia of the rotating parts of synchronous motors and rotary converters reasonably small, and I do not, therefore, expect to be able to materially reduce the moments of inertia of these; but I anticipate that the chief improvement in the running of machines of this sort according to my system will be due to the fact that in many cases in a system of distribution supplied by direct-coupled prime movers and generators, the combined moments of inertia of the rotating parts of which are relatively small, running in conjunction with a suitable kinetic compensator, the fluctuations of periodicity will be less than if the system were fed by prime movers and generators without a kinetic compensator, the rotating parts having combined moments of inertia proportioned as is usual for such machinery at the present time.

It is of course evident that the usual devices for reducing hunting, such as dash-pots on governors and copper dampers on pole-pieces, may also be employed, if desired, with machines operating on my system.

As regards the starting of kinetic compensators it is evident that any of the usual methods of starting synchronous motors and of synchronizing the same with the system are applicable to kinetic compensators.

As I have stated above, I do not limit myself to any of the particular forms shown or indicated in any of the drawings; but

What I claim is—

1. The combination of a plurality of prime movers without fly-wheels, a plurality of alternate-current generators running in parallel driven directly by the same, the combined moments of inertia of the rotating parts of said prime movers and generators being reduced to substantially the minimum necessary for constructive reasons, with a compensating synchronous motor running in parallel with said generators and means for controlling said compensating synchronous motor in order to maintain the potential difference of the system substantially constant in effective value and periodicity without material variation in its speed, by absorbing energy from and restoring the same to the system, substantially as and for the purpose described.

2. The combination of a plurality of prime movers without fly-wheels, a plurality of alternate-current generators running in parallel driven directly by the same, the combined moments of inertia of the rotating parts of said prime movers and generators being reduced to substantially the minimum necessary for constructive reasons, a loaded synchronous motor running in parallel with said generators and a compensating synchronous motor running in parallel with said generators and motor and means for controlling said compensating synchronous motor in order to maintain the potential difference of the system substantially constant in effective value and periodicity without material variation in its speed, by absorbing energy from and restoring the same to the system, substantially as and for the purposes described.

3. The combination of a plurality of prime movers without fly-wheels, a plurality of alternate-current generators running in parallel driven directly by the same, the combined moments of inertia of the rotating parts of said prime movers and generators being reduced to substantially the minimum necessary for constructive reasons, a rotary converter running in parallel with said generators, and a compensating synchronous motor running in parallel with said generators and rotary converter and means for controlling said compensating synchronous motor in order to maintain the potential difference of the system substantially constant in effective value and periodicity without material variation in its speed, by absorbing energy from and restoring the same to the system, substantially as and for the purposes described.

4. The combination of a plurality of prime movers without fly-wheels, a plurality of alternate-current generators running in parallel driven directly by the same the combined moments of inertia of the rotating parts of said prime movers and generators being reduced to substantially the minimum necessary for constructive reasons, a loaded synchronous motor and a rotary converter running in parallel with said generators and a compensating synchronous motor running in parallel with said generators, motor and converter and means for controlling said compensating synchronous motor in order to maintain the potential difference of the system substantially constant in effective value and periodicity without material variation in its speed by absorbing energy from and restoring the same to the system, substantially as and for the purposes described.

5. The combination of a plurality of prime movers without fly-wheels, a plurality of alternate-current generators running in parallel driven directly by the same, the combined moments of inertia of the rotating parts of said prime movers and generators being reduced to substantially the minimum necessary for constructive reasons, with a compensating synchronous motor running in parallel with said generators and having a rotating member provided with parts of great moment of inertia whereby the motor is adapted to maintain the potential difference of the system substantially constant in effective value and periodicity without material variation in its speed by absorbing energy from and restoring the same to the system, substantially as and for the purpose described.

6. The combination of a plurality of prime movers without fly-wheels, a plurality of alternate-current generators running in parallel driven directly by the same, the combined moments of inertia of the rotating parts of said prime movers and generators being reduced to substantially the minimum necessary for constructive reasons, a loaded synchronous motor running in parallel with said generators and a compensating synchronous motor having a rotating member provided with parts of great moment of inertia also running in parallel with said generators and motor whereby the motor is adapted to maintain the potential difference of the system substantially constant in effective value and periodicity without material variation in its speed by absorbing energy from and restoring the same to the system, substantially as and for the purposes described.

7. The combination of a plurality of prime movers without fly-wheels, a plurality of alternate-current generators running in parallel driven directly by the same, the combined moments of inertia of the rotating parts of said prime movers and generators being reduced to substantially the minimum necessary for constructive reasons, a rotary converter running in parallel with said generators, and a compensating synchronous motor having a rotating member provided with parts of great moment of inertia also running in parallel with said generators and rotary converter, whereby the motor is adapted to maintain the potential difference of the system substantially constant in effective value and periodicity without material variation in its speed by absorbing energy from and restoring the same to the system, substantially as and for the purposes described.

8. The combination of a plurality of prime movers without fly-wheels, a plurality of alternate-current generators running in parallel driven directly by the same the combined moments of inertia of the rotating parts of said prime movers and generators being reduced to substantially the minimum necessary for constructive reasons with a compensating synchronous motor provided with means for automatically periodically absorbing and restoring energy from and to the system when the potential difference at its terminals is independently maintained absolutely constant in effective value and periodicity, said synchronous motor being arranged to run in parallel with said generators and adapted to maintain the potential difference of the system substantially constant in effective value and periodicity without material variation in its speed, substantially as and for the purposes specified.

9. The combination of a plurality of prime movers without fly-wheels, a plurality of alternate-current generators running in parallel driven directly by the same the combined moments of inertia of the rotating parts of said prime movers and generators being reduced to substantially the minimum necessary for constructive reasons, a loaded synchronous motor running in parallel with said generators and a compensating synchronous motor provided with means for automatically periodically absorbing and restoring energy from and to the system when the potential difference at its terminals is independently maintained absolutely constant in effective value and periodicity, said synchronous motor being arranged to run in parallel with said generators and motor and adapted to maintain the potential difference of the system substantially constant in effective value and periodicity without material variation in its speed, substantially as and for the purposes described.

10. The combination of a plurality of prime movers without fly-wheels, a plurality of alternate-current generators running in parallel driven directly by the same the combined moments of inertia of the rotating parts of said prime movers and generators being reduced to substantially the minimum necessary for constructive reasons, a rotary converter running in parallel with said generators and a compensating synchronous motor provided with means for automatically periodically absorbing and restoring energy from and to the system when the potential difference at its terminals is independently maintained absolutely constant in effective value and periodicity, said synchronous motor being arranged to run in parallel with said generators and rotary converter and adapted to maintain the potential difference of the system substantially constant in effective value and periodicity without material variation in its speed, substantially as and for the purposes described.

11. The combination of a plurality of prime movers without fly-wheels, a plurality of alternate-current generators running in parallel driven directly by the same, the combined moments of inertia of the rotating parts of said prime movers and generators being reduced to substantially the minimum necessary for constructive reasons, with a compensating synchronous motor provided with a fly-wheel running in parallel with said generators whereby the motor is adapted to maintain the potential difference of the system substantially constant in effective value and periodicity without material variation in its speed by absorbing energy from and restoring the same to the system, substantially as and for the purpose described.

12. The combination of a plurality of prime movers without fly-wheels, a plurality of alternate-current generators running in parallel driven directly by the same the combined moments of inertia of the rotating parts of said prime movers and generators being reduced to substantially the minimum necessary for constructive reasons, a loaded synchronous motor running in parallel with said generators and a compensating synchronous motor provided with a fly-wheel running in parallel with said generators and motor whereby the motor is adapted to maintain the potential difference of the system substantially constant in effective value and periodicity without material variation in its speed by absorbing energy from and restoring the same to the system, substantially as and for the purposes described.

13. The combination of a plurality of prime movers without fly-wheels, a plurality of alternate-current generators running in parallel driven directly by the same the combined moments of inertia of the rotating parts of said prime movers and generators being reduced to substantially the minimum necessary for constructive reasons, a rotary converter running in parallel with said generators, and a compensating synchronous motor provided with a fly-wheel running in parallel with said generators and rotary converter whereby the motor is adapted to maintain the potential difference of the system substantially constant in effective value and periodicity without material variation in its speed by absorbing energy from and restoring the same to the system, substantially as and for the purposes described.

14. The combination of a plurality of prime movers without fly-wheels, a plurality of alternate-current generators running in parallel driven directly by the same, the combined moments of inertia of the rotating parts of said prime movers and generators being reduced to substantially the minimum necessary for constructive reasons, a compensating synchronous motor running in parallel with said generators and having a rotating member provided with parts of great moment of inertia whereby the motor is adapted to maintain the potential difference of the system substantially constant in effective value and periodicity without material variation in its speed, and a centrifugal governor driven by said synchronous motor, and means operated by said governor to control the power developed by all the prime movers, substantially as described.

15. The combination of a plurality of prime movers, without fly-wheels, provided with runaway-governors, a plurality of alternate-current generators running in parallel driven directly by the same, the combined moments of inertia of the rotating parts of said prime movers and generators being reduced to substantially the minimum necessary for constructive reasons, a compensating synchronous motor running in parallel with said generators and having a rotating member provided with parts of great moment of inertia whereby the motor is adapted to maintain the potential difference of the system substantially constant in effective value and periodicity without material variation in its speed, and a centrifugal governor driven by said synchronous motor, and means operated by said governor to control the power developed
5 by all the prime movers, substantially as described.

In testimony whereof I have signed my name to this specification in the presence of two subscribing witnesses.

HENRY COOK LEAKE.

Witnesses:
T. R. HUTCHINSON,
ELIAS YEOMAN.